United States Patent [19]
Osaki et al.

[11] Patent Number: 5,784,407
[45] Date of Patent: Jul. 21, 1998

[54] METHOD AND DEVICE FOR MONITORING AN ABNORMALITY IN DIGITALLY TRANSMITTED AUDIO SIGNALS

[75] Inventors: Bunri Osaki; Hiroshi Wakabayashi, both of Tokyo, Japan

[73] Assignee: NEC Corporation, Tokyo, Japan

[21] Appl. No.: 616,587

[22] Filed: Mar. 15, 1996

[30] Foreign Application Priority Data

Mar. 15, 1995 [JP] Japan .................................. 7-054840

[51] Int. Cl.$^6$ .................................. H04B 3/46; H04J 3/14
[52] U.S. Cl. .......................... 375/224; 370/242; 370/284; 371/48
[58] Field of Search ....................... 375/259, 224, 375/285, 295, 296, 316, 340; 371/48; 370/241, 242, 248, 276, 284

[56] References Cited

U.S. PATENT DOCUMENTS 5,502,716  3/1996  Rhebergen .............................. 370/284

*Primary Examiner*—Chi H. Pham
*Assistant Examiner*—William Luther
*Attorney, Agent, or Firm*—Sughrue, Mion, Zinn, Macpeak & Seas, PLLC

[57] ABSTRACT

An analogue audio signal input to a transmission unit 1 is band limited into a frequency band lower than that of a main signal pass with a low-pass filter 21 and then converted into a digital value with a sampling clock lower than the main signal pass by an analogue/digital converter 22. All bits of the converted digital signal are inverted by an inverter 23. The digital signal input to a reception unit 3 via a transmission channel 100 is inverted by inverter 42 and is digital/analogue converted by digital/analogue converter 43 with the sampling clock lower than the main signal pass. The resultant signal is band limited into the low frequency band through a low-pass filter 44 and then output to a level comparator 45. A low-pass filter 46 band limits the signal for the main signal pass into the low frequency bang. The level comparator 45 compares the output level of the low-pass filter 44 with that of the low-pass filter 46.

13 Claims, 2 Drawing Sheets

METHOD AND DEVICE FOR MONITORING AN ABNORMALITY IN DIGITALLY TRANSMITTED AUDIO SIGNALS

BACKGROUND OF THE INVENTION

This invention relates to a digital transmission system and, more particularly, to a supervisory art therein for monitoring an abnormality in transmitting audio signals in an analogue base band.

In case of an analogue transmission channel, in a conventional supervisory system for monitoring the transmission abnormality, a transmission unit inserts a pilot carrier signal in the area other than the audio frequency band and a reception unit then demultiplexes the carrier signal for level monitoring.

In case of a digital transmission channel, the abnormality is monitored by using digital/analogue converters (D/A CONV) 56 and 65 for a supervisory circuit by which analogue level is compared with that of a main signal as shown in FIG. 2.

In the above supervisory system, a transmission unit 5 band limits an input analogue audio signal with a low-pass filter (LPF) 51. The band limited signal is converted into a digital value by an analogue/digital converter (A/D CONV) 52. The digital signal is multiplexed in a multiplexing circuit (MUX) 53 and then modulated in a modulation circuit (MOD) 54, which is sent to a transmission channel 100.

A supervisory circuit converts the signal which has been converted as a digital value by the analogue/digital converter 52 into an analogue value by the digital/analogue converter 56. The analogue signal is band limited with the low-pass filter 57 and sent to a level comparator (COMP) 58.

The level comparator 58 compares levels between the analogue signal delayed by a delay element (DELAY) 55 after having been band limited with the low-pass filter 51 and the analogue signal band limited through the low-pass filter 57. In case the level difference is not less than a threshold value ε, the operation abnormality in the circuit is detected. The delay element 55 adjusts delay amounts of the analogue/digital converter 52 and the digital/analogue converter 56 to the analogue signal which has been band limited through the low-pass filter 51.

In the reception unit 6, the digitally transmitted signal on the transmission channel 100 is demodulated by a demodulator (DIM) 61 and then demultiplexed into a digital audio data by a demultiplexing circuit (DMUX) 62. The demultiplexed data is digital/analogue converted by the digital/analogue converter 63 and band limited with the band pass filter 64. The resultant output analogue audio signal is input to the level comparator 67.

The data demultiplexed by the demultiplexing circuit 62 is digital/analogue converted by the digital/analogue converter 65 and band limited with the band pass filter 66, which is sent to the level comparator 67. The level comparator 67 compares levels between the analogue signal which has been band limited with the band pass filter 64 and the analogue signal which has been band limited with the band pass filter 66. In case the level difference is not less than the threshold value ε, an abnormality in digital/analogue conversion is detected.

In the conventional supervisory system for monitoring the transmission abnormality, the transmission unit inserts a pilot carrier signal into the area other than the audio frequency band on the analogue transmission channel. Therefore the transmission frequency band has to be set to be not less than the value of the carrier frequency, raising the sampling clock frequency. As a result, the data transfer rate increases, requiring the filter for demultiplexing the carrier signal.

In the supervisory system in which an additional digital/analogue converter for monitoring is provided with the digital transmission channel, monitoring is conducted only to the analogue/digital converter or the digital/analogue converter. Monitoring the multiplexing section, demultiplexing section, transmission channel or the like requires the additional parity. In this case, the digital/analogue converter and the low-pass filter for monitoring are required to have the same performances as the digital/analogue converter and the low-pass filter for a main signal, resulting in deteriorated reliability and increased cost resulting from the system expansion.

SUMMARY OF THE INVENTION

It is an object of the present invention to provide a digital transmission system in which audio monitoring is conducted with high reliability at a low cost.

The above object of the present invention is achieved by a digital transmission system for digitally transmitting an analogue base band audio signal.

Furthermore, the above object of the present invention is achieved by a supervisory method for monitoring transmission abnormality in a digital transmission system for digitally transmitting an analogue base band audio signal.

The present invention band limits an audio signal sent from the transmission unit as n-bit (n is a positive integer) digital data to have a predetermined frequency with the low-pass filter of the audio signal supervisory circuit in the transmission unit.

The band limited audio signal is analogue/digital converted to m-bit (m is a positive integer, m<n) digital data by the analogue/digital converter. The output of the analogue/digital converter is inverted by an inverter and multiplexed with the main signal, which is sent to the transmission channel.

An inverter in the audio signal supervisory circuit of the reception unit inverts the m-bit digital data which has been digitally transmitted from the transmission unit. The inverted digital data are digital/analogue converted by the digital/analogue converter and band limited to have a predetermined frequency with the low-pass filter. The main signal digital data transmitted from the transmission unit is digital/analogue converted into an analogue audio signal, which is band limited to have a predetermined frequency with another low-pass filter for outputting. The levels between resultant two outputs of the respective low-pass filters are compared with a level comparator.

The above construction enables the digital transmission system to systematically monitor the main audio signal flow beginning from the analogue circuit, digital circuit, transmission channel, digital circuit and analogue circuit.

In an embodiment of the present invention, the audio signal supervisory circuit is realized by increasing a small number of bits and using simply constructed analogue/digital converter and digital/analogue converter, resulting in reliable audio monitoring at a low cost.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
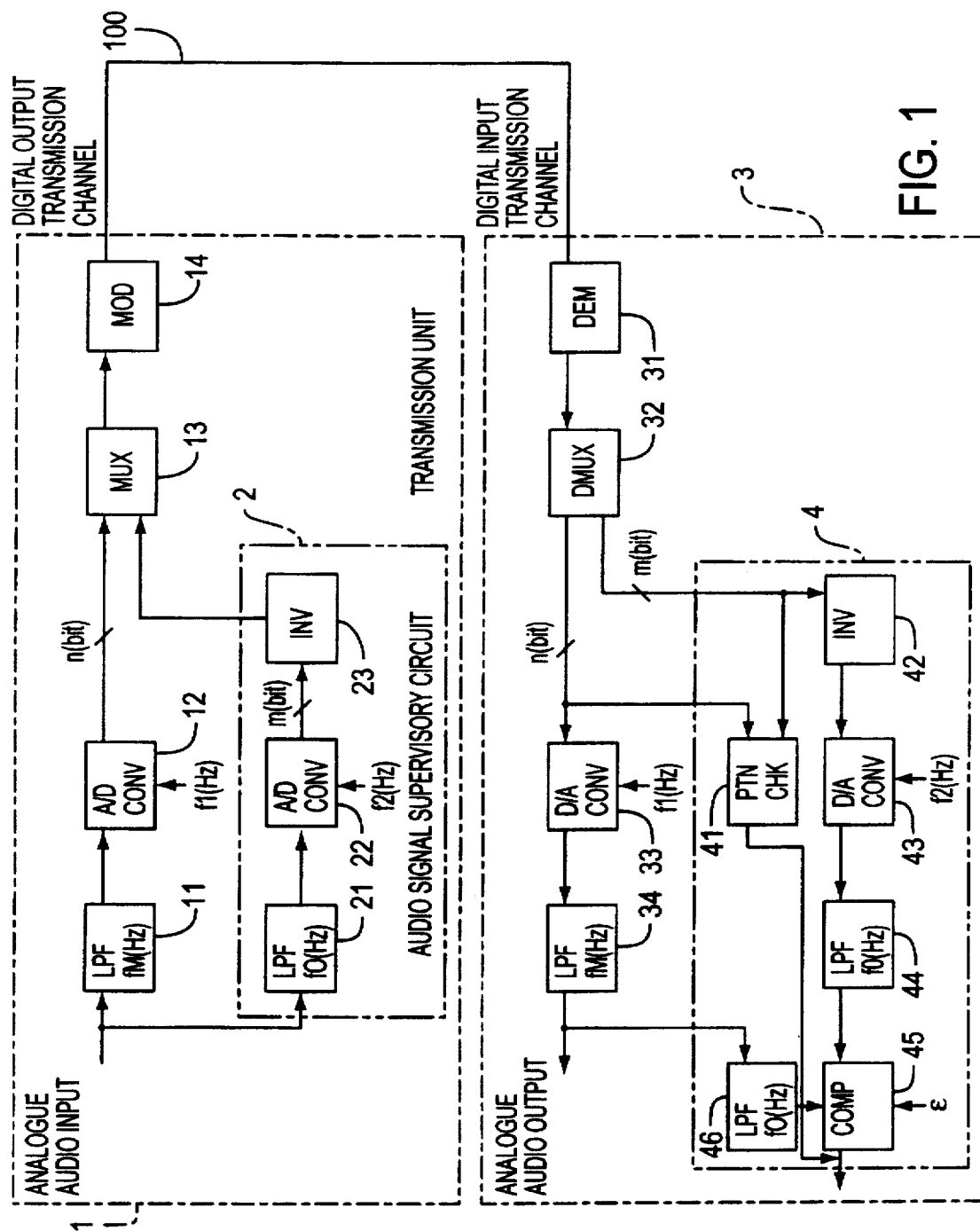
FIG. 1 is a block diagram of a representative construction of an embodiment according to the present invention.
Figure 2:
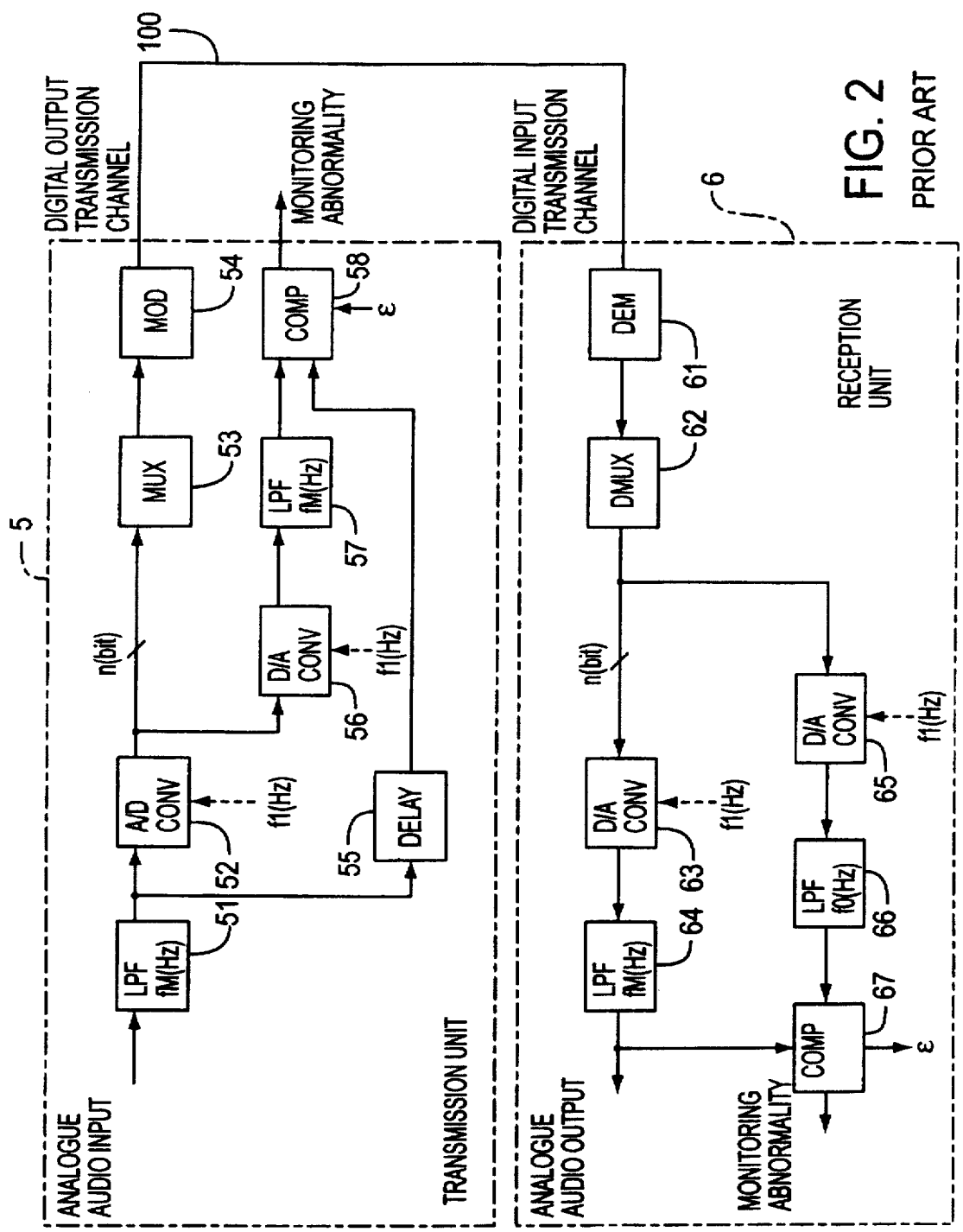
FIG. 2 is a block diagram of a representative construction of an embodiment according to the prior art.

Next an embodiment of the present invention is described referring to the drawing.

FIG. 1 is a block diagram of a representative construction of an embodiment according to the present invention.

In FIG. 1, a digital transmission system according to this embodiment is constructed by connecting a transmission unit 1 to a reception unit 3 via a transmission channel 100.

The transmission unit 1 comprises a low-pass filter (LPF) 11, an analogue/digital converter (A/D CONV) 12, a multiplexing circuit (MUX) 13 and a modulation circuit (MOD) 14 and an audio signal supervisory circuit 2. The audio signal supervisory circuit 2 comprises a low-pass filter 21, an analogue/digital converter 22 and an inverter (INV) 23.

The reception unit 3 comprises a demodulator (DEM) 31, demultiplexing circuit (DMUX) 32, a digital/analogue converter (D/A CONV) 33, low pass filter 34 and an audio signal supervisory circuit 4. The audio signal supervisory circuit 4 comprises a pattern check circuit (PTN CHK) 41, an inverter 42, a digital/analogue converter 43, low-pass filters 44 and 46 and a level comparator (COMP) 45.

Referring to FIG. 1, an explanation is described with respect to a supervisory operation for monitoring transmission abnormality of the audio signal in the digital transmission system according to the embodiment of the present invention.

An analogue audio signal input to the transmission unit 1 is band limited with the low-pass filter 11 to have fM (Hz) for the main signal pass and then converted into an n-bit digital value at f1 (Hz) by the analogue/digital converter 12.

While in the audio signal supervisory circuit 2, the analogue audio signal input to the transmission unit 1 is band limited to have f0 (Hz) (fM>f0) with the low-pass filter 21 and then converted into the m-bit (n>m) digital value at f2 (Hz) (f1>f2) by the analogue/digital converter 22. All bits of the converted digital signal with the analogue/digital converter 22 are inverted with the inverter 23.

The signal generated in the main signal pass and the signal generated in the audio signal supervisory circuit 2 are multiplexed by the multiplexing circuit 13 and then modulated by the modulation circuit 14. The resultant signal is sent to the transmission channel 100.

The data input to the reception unit via the transmission channel 100 is demodulated by the demodulator 31 and demultiplexed into the n-bit data for the main signal and the m-bit data for the audio signal supervisory circuit 4 by the demultiplexing circuit 32.

The n-bit data for the main signal is digital/analogue converted to the n-bit signal at f1 (Hz) and band limited to have fM with the low pass filter 34, which is output as an analogue audio output. The analogue audio output is band limited to have f0 (Hz) with the low-pass filter 46 and output to the level comparator 45.

In the audio signal supervisory circuit 4, the pattern check circuit 41 checks whether or not all patterns of the n-bit data for the main signal demultiplexed with the demultiplexing circuit 32 have "0" and whether all patterns of the m-bit data for the audio signal supervisory circuit 4 have "1". The transmission unit 1 has all "0" patterns output from the main signal pass in case of no analogue audio inputs. On the contrary the transmission unit 1 has all "1" patterns output from the audio signal supervisory circuit 2. The pattern check circuit 41 checks whether those signals have been transmitted via the transmission channel 100.

The m-bit data for the audio signal supervisory circuit 4 which have been demultiplexed with the demultiplex circuit 32 are inverted with the inverter 42 and digital/analogue converted into the m-bit signal and f2 (Hz) by the digital/analogue converter 43. The resultant signal is further band limited to have f0 (Hz) with the low-pass filter 44 and then output to the level comparator 45.

The level comparator 45 compares a level of analogue audio output which has been band limited with the low-pass filter 44 and a level of analogue audio output which has been band limited with the low-pass filter 46. If the level difference is not less than the threshold value e, operation abnormality in the digital transmission system is detected.

The level comparator 45 can detect the system abnormality from random data caused by abnormality of the digital circuit or the transmission channel 100. However in case all bits of the data become a fixed pattern, the level comparator 45 cannot detect the abnormality. After being demultiplexed with the demultiplexing circuit 32, the n-bit data for the main signal and the m-bit data for the audio signal supervisory circuit 4 do not have the identical fixed patterns because the m-bit data has been inverted with the inverter 23 in the audio signal supervisory circuit 2.

The pattern check circuit 41 checks both patterns of the n-bit data for the main signal and the m-bit data for the audio/signal supervisory circuit 4. This allows the audio signal supervisory circuit 4 to monitor the abnormality even when the m-bit data and the n-bit data have the identical fixed patterns. As a result, abnormality monitoring can be conducted in the respective blocks ranging from the low-pass filter 11 of the transmission unit 1 including the main signal pass to the low-pass filter 34 of the reception unit 3.

In the embodiment of the present invention, dynamic range of the main signal is set to be the same as that of the supervisory circuit. Furthermore the resolution of the audio signal is set to fM>f0 (analogue signal band), f1>f2 (sampling clock) and n>m (bit number). Therefore the audio signal supervisory circuits 2 and 4 can be configured at a low cost. An error between the main signal and the supervisory circuit results in "$-20\log(2^{(m+1)})(dB)$".

It is assumed that wide band audio signals are transmitted, for example, broadcasting, at 20 (kHz) as the band fM and 48 (kHz) of the sampling clock f1 with 16 bits through SONET network.

In case of setting the band f0 to 3.4 (kHz), the sampling clock f2 to 8 (kHz) and the bit number m to 8 bit, the error between the main signal and the supervisory circuit results in −54 (dB), allowing for sufficient monitoring.

Furthermore, multiplexing or demultiplexing of the transmission frame can be easily conducted by inserting the supervisory circuit data into a vacant slot of 1 byte at 1 transmission frame. In this case, the data number for the supervisory circuit is 64 (k bit/second). When adding 1 bit parity at every 1 sample, the bit number of the supervisory circuit data becomes 48 (k bit/second), making little difference compared with the bit increase of the present invention.

In the present invention, the analogue/digital converter 22, digital/analogue converter 43 and low-pass filters 21, 44 and 46 for the supervisory circuit having low resolution are applicable, which can be configured at a lower cost compared with those for the main signal. The circuit size can also be further reduced, thus improving reliability.

As aforementioned, the transmission unit 1 is provided with the audio signal supervisory circuit 2 comprising the low-pass filter 21 for band limiting the audio signal transmitted as the n-bit (n is a positive integer) digital data to have a predetermined frequency, the analogue/digital converter 22 for analogue/digital converting the audio signal which has been band limited with the low-pass filter 21 into the m-bit (m is a positive integer; m<n) digital data and the inverter 23 for inverting the output of the analogue/digital converter 22. The reception unit 3 is provided with the audio signal supervisory circuit 4 comprising the inverter 42 for inverting the m-bit digital data which have been digitally transmitted from the transmission unit 1, the digital/analogue converter 43 for digital/analogue converting the digital data which have been inverted by the inverter 42, the low-pass filter 44 for band limiting the output of the digital/analogue converter 43 to have a predetermined frequency, the low-pass filter 46 for band limiting the analogue audio signal obtained by digital/analogue converting the main signal digital data which have been digitally transmitted from the transmission unit 1 to have a predetermined frequency and the level comparator 45 for comparing levels of outputs between the low-pass filters 44 and 46. This construction enables the digital transmission system to systematically monitor the main audio signal flow beginning from the analogue circuit, digital circuit, transmission channel 100, digital circuit and analogue circuit.

In the embodiment of the present invention, the audio signal supervisory circuits 2 and 4 can be configured by slightly increasing the bit number and using simply constructed analogue/digital converter 22 and digital/analogue converter 43, resulting in reliable audio monitoring at a low cost.

In the present invention, an audio signal as the n-bit (n is a positive integer) digital data transmitted from the transmission unit is band limited to have a predetermined frequency.

The band limited audio signal is analogue/digital converted into the m-bit (m is a positive integer, m<n) digital data and then digitally transmitted to the reception unit.

The m-bit digital data digitally transmitted from the transmission unit is inverted and digital/analogue converted.

The digital/analogue converted signal is band limited to have a predetermined frequency. While the digital data of the min signal which has been digitally transmitted from the transmission unit is digital/analogue converted into the analogue audio signal and then band limited to have a predetermined frequency. Levels of the resultant two band limited signals are compared. As a result, highly reliable audio monitoring can be realized at a low cost.

What is claimed is:

1. A digital transmission system for digitally transmitting an analogue base band audio signal, said digital transmission system comprising:
   a transmission unit having:
      a first and second low-pass filter for band limiting a first analogue audio signal into predetermined frequency bands; and
      a first and second analogue/digital conversion means for respectively converting the outputs of said first and second low-pass filters to n-bit digital data and m-bit digital data respectively, where m is less than n; and
   a reception unit having:
      a digital/analogue conversion means for converting said m-bit digital data to an analogue data signal;
      a third low-pass filter for band limiting said analogue data signal into a predetermined frequency band;
      a fourth low-pass filter for band limiting a second analogue audio signal obtained by analogue converting said n-bit digital data transmitted from said transmission unit; and
      a comparison means for comparing the output level of said third low-pass filter with the output level of said fourth low-pass filter.

2. The digital transmission system of claim 1, wherein said comparison means comprises:
   a means for calculating the difference between an output level of said third low-pass filter and an output level of said fourth low-pass filter and determining the transmission abnormal if a calculated difference is not less than a predetermined threshold value.

3. The digital transmission system of claim 1 wherein said transmission unit further comprises:
   a multiplexing means for multiplexing said n-bit digital data and said m-bit digital data; and
   said reception unit further comprises:
      a demultiplexing means for demultiplexing a received digital data input signal into said n-bit digital data and said m-bit digital data.

4. The digital transmission system of claim 3, wherein said transmission unit further comprises:
   a first inverter for inverting said m-bit digital data and outputting said inverted m-bit digital data to said multiplexing means; and
   said reception unit further comprises:
      a second inverter for inverting said m-bit digital data which have been demultiplexed and outputting said inverted m-bit data to said digital/analogue conversion means; and
      a decision means for determining whether said demultiplexed n-bit digital data and said demultiplexed m-bit digital data have an identical fixed pattern.

5. The digital transmission system of claim 4, wherein said decision means comprises a means for determining the transmission abnormal if said demultiplexed n-bit digital data and said demultiplexed m-bit digital data have an identical fixed pattern.

6. The digital transmission system of claim 1, wherein each of said second, third and fourth low-pass filters band limits an audio signal into the same frequency band.

7. A digital transmission system for digitally transmitting an analogue base band audio signal, said digital transmission system comprising:
   a transmission unit having:
      a first low-pass filter for band limiting a first analogue audio signal into a second analogue audio signal with a predetermined frequency band;
      a second low-pass filter for band limiting said first analogue audio signal into a third analogue audio signal with a frequency band different from said second analogue audio signal;
      a first analogue/digital conversion means for converting said second analogue audio signal into n-bit digital data;
      a second analogue/digital conversion means for converting said third analogue audio signal into m-bit (m<n) digital data;
      a first inverter for inverting said m-bit digital data; and
      a multiplexing means for multiplexing said n-bit digital data and said m-bit digital data that has been inverted with said first inverter; and a reception unit having:
- a demultiplexing means for demultiplexing a received digital data input signal into said n-bit digital data and said m-bit digital data;
- a first digital/analogue conversion means for converting said demultiplexed n-bit digital data into a sixth analogue audio signal;
- a fourth low-pass filter for band limiting an analogue audio signal after passing through a fifth low-pass filter into said fifth analogue audio signal with a predetermined frequency band;
- a second inverter for inverting said demultiplexed m-bit digital data;
- a second digital/analogue conversion means for converting said digital data inverted with said second inverter into analogue data;
- a third low-pass filter for band limiting an output of said second digital/analogue conversion means into a fourth analogue audio signal with a predetermined frequency band;
- a first decision means for calculating a difference between an output level of said third low-pass filter and an output level said fourth low-pass filter and determining the transmission abnormal if the calculated difference is not less than a predetermined threshold value; and
- a second decision means for examining whether said n-bit digital data and m-bit digital data which have been demultiplexed with said demultiplexing means have an identical fixed pattern and determining the transmission abnormal if said n-bit digital data and said m-bit digital data have an identical fixed pattern.

8. The digital transmission system of claim 7, wherein each of said third, fourth and fifth analogue audio signals has the same frequency band.

9. A supervisory method for monitoring transmission abnormalities in a digital transmission system for digitally transmitting an analogue base band audio signal, said supervisory method comprising:

in a transmission side,
- a first and second band limiting step of band limiting a first analogue audio signal into predetermined frequency bands;
- a first and second conversion step of respectively converting the results of said first and second band limiting steps into n-bit digital data and m-bit digital data respectively, where m is less than n;
- a transmission step of transmitting said m-bit digital data together with said n-bit digital data that is a main signal; and in a reception side,
- a conversion step of converting said m-bit digital data into an analogue data signal;
- a third band limiting step of band limiting said analogue data signal into a predetermined frequency band;
- a fourth band limiting step of band limiting a second analogue audio signal obtained by analogue converting said n-bit digital data, resulting from said transmission step, into a predetermined frequency band; and
- a decision step of calculating a difference between an output level of a signal band limited in said third band limiting step and an output level of a signal band limited in said fourth band limiting step and determining the transmission abnormal if said calculated difference is not less than a predetermined threshold value.

10. The supervisory method for monitoring transmission abnormality in a digital transmission system of claim 9, wherein each of said second third and fourth band limiting steps band limits an audio signal into the same frequency band.

11. The supervisory method for monitoring transmission abnormality in a digital transmission system of claim 9, wherein said transmission side further comprises:
- a multiplexing step of multiplexing said n-bit digital data and said m-bit digital data; and said reception side further comprises a second inverting step of inverting said m-bit digital data: and
- a demultiplexing step of demultiplexing received data into said n-bit digital data and said m-bit digital data.

12. The supervisory method for monitoring transmission abnormality in a digital transmission system of claim 11, wherein said transmission side further comprises a first inverting step of inverting said m-bit digital data and multiplexing said inverted m-bit digital data and said n-bit digital data; and said reception side further comprises a decision step of determining whether said demultiplexed n-bit digital data and said m-bit digital data have an identical fixed pattern.

13. The supervisory method for monitoring transmission abnormality in a digital transmission system of claim 12, wherein said decision step determines the transmission abnormal if said demultiplexed n-bit digital data and said m-bit digital data have an identical fixed pattern.

* * * * *